Aug. 11, 1931.  H. R. FREUND  1,818,946
ASSEMBLER DRIVE CLUTCH FOR TYPOGRAPHICAL MACHINES
Filed Sept. 19, 1929
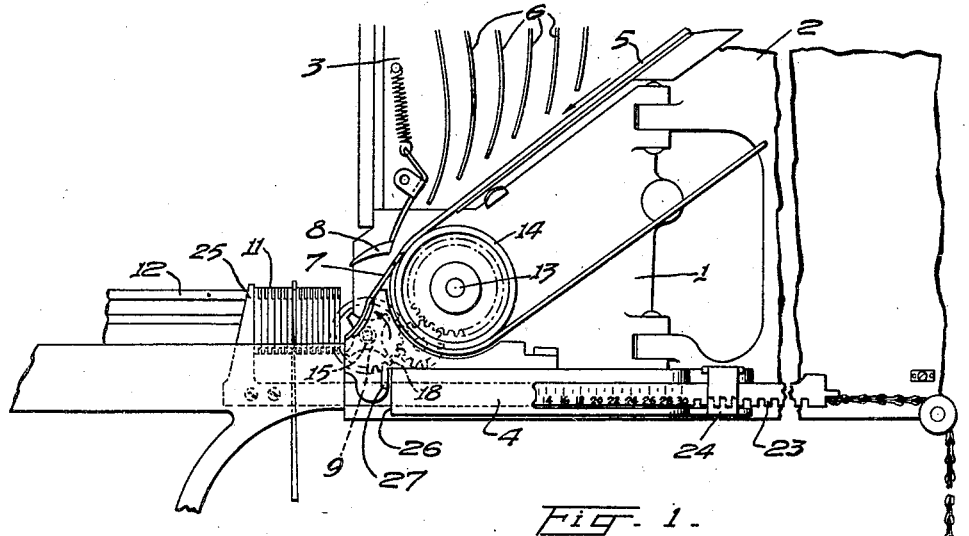
Fig. 1.
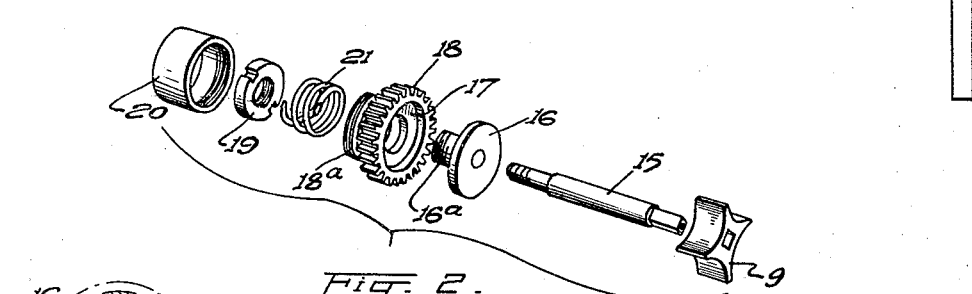
Fig. 2.
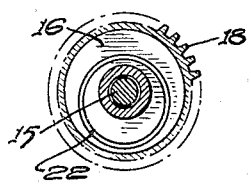
Fig. 4.
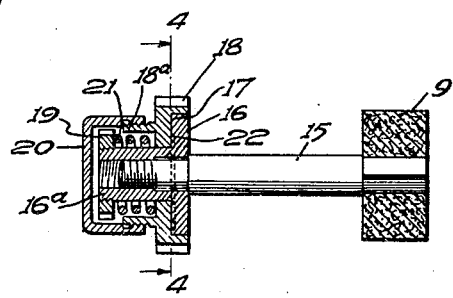
Fig. 3.
Herman R. Freund
INVENTOR.
BY 
ATTORNEYS.

Patented Aug. 11, 1931

1,818,946

UNITED STATES PATENT OFFICE

HERMAN R. FREUND, OF BROOKLYN, NEW YORK, ASSIGNOR TO INTERTYPE CORPORATION, OF BROOKLYN, NEW YORK, A CORPORATION OF NEW YORK

ASSEMBLER DRIVE CLUTCH FOR TYPOGRAPHICAL MACHINES

Application filed September 19, 1929. Serial No. 393,763.

The present invention relates to typographical machines of the general class disclosed in Letters Patent of the U. S. No. 436,532 granted Sept. 16, 1890, to O. Mergenthaler wherein circulating matrices are released from a magazine and conveyed on an inclined traveling belt over a rotating assembler star wheel which pushes them to upright position in an assembling elevator, whereupon the line is automatically carried to casting position before a mold into which molten metal is forced from a metal pot to cast a type bar, the line of matrices then being transferred to a distributing mechanism which returns the individual matrices to their proper channels in the magazine.

The present invention relates more particularly to the assembling mechanism usually employed in machines of this class, and it has particular reference to the assembler star wheel mechanism which is usually provided with a friction disk clutch under spring tension so that in case of an overset or tight line, which would block it from rotating, the star wheel driving gear at the rear of the assembler can continue to rotate freely through the power transmitted to it from the assembler driving gears, although the star wheel and its shaft with the friction disk attached thereto will stop until the tight or obstructing matrix is removed. The friction disk might be lubricated to prevent binding in such cases, but the small quantity of lubricant that can safely be applied soon becomes gummed and dried up because of exposure to dust accumulation, and this results in binding and wear.

The construction of the star wheel friction clutch is extremely important because the star wheel which rotates and throws each matrix upright in the assembling elevator must turn freely yet stop easily whenever a blocking condition occurs. Moreover, if the star wheel is blocked by a tight or too full composed line, the clutch surfaces must wipe or rub freely since any sudden gripping or binding between these surfaces would result in damage to the star wheel, its shaft, or the driving gears. A binding condition which tends to force the star wheel to rotate against a tight line will further damage or break the teeth on the assembler slide rack, because the end of the matrix line remote from the star wheel bears against a block rigidly fastened to the rack member while the star wheel blades strike the last matrix in the other end of the line, and if the star wheel is forced to rotate, the pressure exerted will act to drive the entire line against the assembler slide block. The block however cannot move because the slide rack teeth engage a detent which is previously set for a predetermined travel of the slide so as to govern the length of the line being composed, so that excessive pressure against the block will be transmitted back to the teeth in the rack slide and the locking detent and cause the teeth to break.

The object of this invention is to provide an improved friction clutch for the star wheel shaft wherein the component parts are made into a unit and enclosed in a casing so that proper lubrication can be applied and maintained so that the clutch cannot bind or deteriorate through wear and accumulation of dust between the working parts, thus obviating the objections hereinbefore referred to.

A further object is to provide a detachable clutch unit which can be readily applied to the assembler used on machines of this class.

To these and other ends the invention consists in certain improvements and combinations and arrangements of parts, all as will be hereinafter more fully described, the features of novelty being pointed out particularly in the claim at the end of the specification.

In the drawings:

Fig. 1 is a fragmentary front elevation of the assembler front of a typographical machine of the class hereinbefore referred to, showing the assembler to which the present invention is applied;

Fig. 2 is a perspective view showing collectively the component parts of the improved friction drive clutch for the assembler star wheel;

Fig. 3 shows the star wheel, its shaft and the unit structure of the friction drive clutch therefor in section taken axially through the center of the star wheel shaft; and Fig. 4 represents a transverse section taken on the line 4—4, Fig. 3.

Similar parts are designated by the same reference characters in the several figures.

The invention is shown applied to the assembler mechanism of a typographical machine of the class hereinbefore referred to, it being noted that the drawings are confined to the details concerned with the present invention, it being understood that none of the usual mechanism of the machine or the assembler mechanism thereof other than parts immediately associated with the star wheel and its driving gear are in any way altered or concerned in carrying out the invention. However, it is to be understood, that the drawings show the preferred embodiment of the invention as an example, and that various alterations and changes in the exact structure may suggest themselves to those skilled in the art so that equivalent constructions are contemplated and such will be included within the scope of the claim.

In the present instance, the assembler 1 is shown hinged to the usual face plate 2 extending across the front of the machine and carrying the entire assembler front 3, assembler 1 and assembler slide 4. The usual matrix delivery belt 5 traveling continually in the direction indicated by the arrow conveys matrices falling by gravity from the magazine through the spaces between the fingers 6 of the assembler front, down over the chute block 7 and under the chute spring 8 to a position where they engage against the blades of the rotating star wheel 9.

When the line of matrices 11 in the usual assembling elevator 12 is composed to the desired length in accordance with the setting of the delivery slide 4, an additional matrix delivered over the star wheel will overcrowd the line, causing it to block the star wheel and to arrest its rotation. The star wheel however, as is well known and shown in Letters Patent of the United States No. 1,657,962 granted Jan. 31, 1928, to E. M. Goodbody, is driven through a train of gears between the shaft 13 of the pulley 14 and the driving gear 18 on the shaft 15 of the star wheel so that provision is made for the gear on the star wheel shaft at the back of the assembler to continue rotating through power transmitted to it by the train of gears while the star wheel and its shaft stop rotating because of being blocked by the overset matrix. The means provided usually consists of a disc fixed to the rear end of the star wheel shaft, the face of which runs dry against a hollowed out portion in the shaft driving gear, a spring urging the gear against the disc.

In Fig. 2, the metal disc 16 and the hollow seat 17 therefor in the driving gear 18 and spring 21 represent all of the usual means just described. The invention herein set forth resides in constructing these parts in such a manner that the disc 16 will be lubricated so that it will run freely or without binding in its seat 17 and in constructing the disc and gear as a unit which can be readily applied or detached to the usual star wheel shaft 15.

To this end, the disc 16 is provided with a cylindrical collar portion 16$^a$ which is threaded interiorly to detachably fit non-rotatably upon the rear end of the shaft 15 and is threaded exteriorly to receive the locking nut 19. The gear 18 for driving the star wheel shaft is also provided with an exteriorly threaded cylindrical collar portion 18$^a$ to receive an internally threaded thimble or cup-shaped, closed cover 20.

As clearly shown in Fig. 3, the disc 16 fits into the hollowed out portion 17 of the gear 18 so that the collar 16$^a$ protrudes through the collar portion 18$^a$ of the gear 18 far enough to allow the coiled compression spring 21 to fit around the outside of the collar 16$^a$ and within the collar 18$^a$, and to compress as the locking nut 19 is drawn up on the collar. The thimble or cap 20 is then drawn up on the thread of collar 18$^a$ of the driving gear so that the spring 21, the collar portion 16$^a$ and the locking nut 19 thereon are completely enclosed. The back of the friction disc 16 is provided with an eccentric groove 22 and the cap 20 is partially filled with grease lubricant before securing it to the driving gear collar 18$^a$ so that as the gear 18 rotates, the lubricant can pass along the bearing surface of the collar 16$^a$ and between it and the hub of the gear 18 and thus reach the groove 22.

From the foregoing it will be apparent that the parts 16, 18, 19, 20 and 21, when assembled in the manner shown in Fig. 3, comprise a unit for the shaft 15 which can readily be removed therefrom by first removing the cap 20 and then the locking nut 19, after which the gear 18 can be removed from the collar 16$^a$ and the latter and the disk 16 can be removed from the shaft 15, and the parts can be reassembled by the reverse operation. It will further be apparent that the enclosed form of structure will prevent dust accumulations from settling between the working parts and causing, by drying up the lubricant or otherwise, the disc 16 to bind against face 17 whenever the clutch is thrown into operation.

If an overset line is composed and rotation of the star wheel is blocked, the star wheel together with shaft 15, disc 16 and locking nut 19 will stop while the driving gear 18 and cap 20 attached thereto will continue to rotate freely through the meshing of the teeth on gear 18 with the intermediate driving gear for the assembler. The power of spring 21 is such that the surface of disc 16 will wipe against the face 17 of the driving gear 18, allowing the gear 18 to move freely without binding when the assembler star wheel 9 is blocked against rotation, the lubricant supplied to the groove 22 being spread over the surface 17 of the gear 18 and the face of the disc 16 contacting therewith to permit free slippage with a minimum of wear, although sufficient friction will exist between the disk 16 and driving gear 18 to insure rotation of the star wheel under normal conditions in the assembling of the matrices.

The free slippage of the star wheel friction clutch as just described so that binding or sudden gripping cannot occur, will prevent breakage of the teeth in the assembler slide rack 23 and its finger operated locking detent 24. If the friction clutch should bind and cause the star wheel to exert undue pressure against the full matrix line, such pressure would be transmitted through block 25 back to the teeth on rack 23, since the locking detent 24 carried on one end of the rack cover plate 26 would be blocked against further movement to the left by the stop lug 27 on the assembler frame. Excessive pressure against the line of matrices would therefore tend to draw the slide rack 23 to the left while the detent member 24 could not move and the teeth in the rack would therefore be subjected to undue strain or breakage. The provision therefore of an enclosed and properly lubricated friction disc, accomplished by the present invention, protects the assembler slide against undue strains and breakage, it relieves the star wheel blades of unnecessary wear, and it avoids chafing and binding between the friction disc parts.

I claim as my invention:—

A friction drive clutch for the assembler star wheel shaft of a typographical machine comprising a friction disk to fit upon said shaft, a driving member rotatably mounted at a side of said disk and having a friction face at one side to engage the disk and having a collar fixed to and projecting from its opposite side and forming a lubricant chamber within it which is in communication at one end with said friction face and is open at its opposite end, a spring holding said disk and driving member in frictional engagement, and a cover removably fitted to said collar on the driving member and closing the open end of said chamber therein.

In testimony whereof I have hereunto set my hand.

HERMAN R. FREUND.